(12) United States Patent
Peng

(10) Patent No.: US 12,021,200 B2
(45) Date of Patent: Jun. 25, 2024

(54) ELECTRODE STRUCTURE WITH BUILT-IN ULTRASONIC STRUCTURES, AND AN ULTRASONIC BATTERY THEREOF

(71) Applicant: Zhijun Peng, Guangdong (CN)

(72) Inventor: Zhijun Peng, Guangdong (CN)

( * ) Notice: Subject to any disclaimer, the term of this patent is extended or adjusted under 35 U.S.C. 154(b) by 0 days.

(21) Appl. No.: 17/349,953

(22) Filed: Jun. 17, 2021

(65) Prior Publication Data

US 2022/0246996 A1 Aug. 4, 2022

(30) Foreign Application Priority Data

Feb. 3, 2021 (CN) .......................... 202110150444.3

(51) Int. Cl.
*H01M 10/42* (2006.01)
*B08B 7/02* (2006.01)
*B08B 17/02* (2006.01)
*H01M 4/13* (2010.01)
*H01M 4/14* (2006.01)
*H01M 10/0525* (2010.01)
*H01M 10/06* (2006.01)

(52) U.S. Cl.
CPC .......... *H01M 10/4214* (2013.01); *B08B 7/028* (2013.01); *B08B 17/02* (2013.01); *H01M 4/13* (2013.01); *H01M 4/14* (2013.01); *H01M 10/0525* (2013.01); *H01M 10/06* (2013.01); *H01M 10/4235* (2013.01)

(58) Field of Classification Search
CPC ......... H01M 10/4214; H01M 10/0525; H01M 10/4235; H01M 4/13; H01M 4/8668; B08B 7/028; B08B 17/02
See application file for complete search history.

(56) References Cited

U.S. PATENT DOCUMENTS

| 3,923,550 A * | 12/1975 | von Krusenstierna ...................... H01M 10/4214 429/229 |
| 5,614,332 A * | 3/1997 | Pavelle ................. H01M 10/42 429/69 |
| 2020/0136198 A1* | 4/2020 | Kasumzade ...... H01M 10/4242 |
| 2020/0321663 A1* | 10/2020 | Chen ....................... H01M 8/18 |

* cited by examiner

*Primary Examiner* — Christopher P Domone
*Assistant Examiner* — Jonathan William Estes

(57) ABSTRACT

An electrode being a positive electrode or a negative electrode contains a built-in ultrasonic vibration module; the ultrasonic vibration module has an ultrasonic vibration element to provide ultrasonic vibration, and the ultrasonic vibration element is electrically connected to wire connection terminals at a top end of or on a top end of the electrode. More than one of such electrode can be used in an ordinary solid lithium battery, a lithium battery, or a lead-acid battery respectively to provide ultrasonic vibration in the battery.

7 Claims, 4 Drawing Sheets

ELECTRODE STRUCTURE WITH BUILT-IN ULTRASONIC STRUCTURES, AND AN ULTRASONIC BATTERY THEREOF

BACKGROUND OF THE INVENTION

A lead-acid battery is a storage battery having electrodes mainly made of lead and oxides thereof, and a sulfuric acid solution being its electrolyte solution. In a discharge state of a lead-acid battery, the main component of the positive electrode is lead dioxide, and the main component of the negative electrode is lead; in a charging state, the main components of both the positive and the negative electrodes are lead sulfate. When a currently available lead-acid battery is used for a certain period of time, lead sulfate crystals will adhere to surfaces of the electrode plates. With the increase of lead sulfate crystals, contact between the electrode plates and the electrolyte solution will be hindered, thereby affecting the lead-acid battery with respect to its power storage as well as charging and discharging performances. Over time, the lead-acid battery will no longer be able to store, charge and discharge power even when the electrode plates of the lead-acid battery is not yet completely worn out.

For this reason, the applicant of this present invention has disclosed the technical solutions for "An ultrasonic lead-acid battery" in CN110931891 (application number 201811098611.9, filed Sep. 20, 2018) in China, the disclosed invention comprises major components including a battery shell, a battery cover, a cluster group, an ultrasonic transducer, and vibration bars. The ultrasonic transducer is mounted on the top of the battery; the vibration bar is inserted into a gap between the positive electrode plate and a separator and a gap between the negative electrode plate and the separator respectively. When the ultrasonic transducer is operated, the vibration bars are driven to vibrate in ultrasonic high-frequency to prevent lead sulfate crystals adhering on the surfaces of the electrode plates so as to provide sufficient and complete contact between the electrode plates and the electrolyte solution. Accordingly, the disclosed invention can greatly alleviate the deterioration of the battery's power storage and prolong the service life of the battery. Although the disclosed invention greatly alleviates the deterioration of battery's power storage and prolongs the service life of the battery compared to traditional lead-acid battery, complexity and size of the battery are increased to a certain extent. Therefore, it is not an optimal solution.

A lithium-ion battery mainly comprises a positive electrode (LiMn2O4 material), a negative electrode (graphite material), electrolyte solution and a separator. When the battery is charged by a power source, electrons on the positive electrode move through an external circuit to the negative electrode, and lithium ions move from the positive electrode into the electrolyte solution, pass through small curved holes on the separator, reach the negative electrode, and combine with the electrons that move to the negative electrode earlier before. When the battery is discharging, the electrons on the negative electrode move through the external circuit to the positive electrode, and the lithium ions move from the negative electrode into the electrolyte solution, pass through the small curved holes on the separator, reach the positive electrode, and then combine with the electrons that move to the positive electrode earlier before. Lithium ions start journey at the positive electrode, and reach the negative electrode after passing through the electrolyte solution. After the battery is charged and discharged for the first time, a passivation layer having the characteristics of solid electrolyte will be formed between the electrodes and the electrolyte solution, and this passivation layer is called a solid electrolyte interface (SEI). SEI has a dual role as an electronic insulator and a good conductor for lithium ions. This SEI layer can protect the battery from harmful reactions, and allow lithium ions to shuttle back and forth between the electrodes and the electrolyte solution. SEI is critical to the performance of a lithium-ion battery. If SEI performance is poor, the battery will have many problems. Once the SEI begins to deteriorate, piles of problems will follow. For example, after multiple charging and discharging, the lithium electrodes are prone to uneven deposition and the growth of crystals. These lithium metal crystals will block the mobility of the lithium ions and affect the movements of the lithium ions, thereby resulting in the loss of battery capacity and decreased charging and discharging efficiency, or, as the lithium metal crystals continue to grow, the separator will be pierced causing short-circuit between the positive and the negative electrodes, and eventually burning the battery. Besides, an environment temperature for operation of a lithium-ion battery is 0-40° C. When the environment temperature is lower than 0° C., the capillaries, also commonly known as "small holes", on the separator shrink due to the principle of thermal expansion and contraction. Therefore, the lithium ions are difficult or unable to pass through the separator; also, the lithium ions are may easily condense in the electrolyte solution and move slowly in the electrolyte solution; as a result, the lithium ion battery cannot be charged and discharged normally, and the overall performance of the battery will be weakened. Therefore, to ensure normal charging and discharging of a lithium-ion battery in a cold weather is also a technical problem pending to be solved urgently.

To this end, the applicant of this application has disclosed the technical solutions for "An ultrasonic intelligent heating and anti-crystallization lithium battery" in CN111755759 (application number 201910235529.4, filed Mar. 27, 2019) in China. The disclosed invention substantially comprises components such as a lithium battery, an ultrasonic transducer, a temperature sensor, a control circuit board module, an ultrasonic generator, and a metal shell. The disclosed invention places the ultrasonic transducer on the metal shell of the lithium battery to reduce or alleviate the formation of lithium metal crystals inside the lithium battery by means of cavitation effect generated by the ultrasonic transducer, thereby preventing the crystals from blocking or piercing the separator, and thus prolonging the service life of the lithium battery; also, under cold weather, the cavitation effect generated by the ultrasonic waves can also be used to accelerate the movement of the lithium ions inside the lithium battery so as to increase an internal temperature of the lithium battery, thereby solving the charging and discharging problem of lithium battery in cold weather. Although the disclosed invention can largely solve the problems of crystallization in the lithium battery and charging and discharging of the lithium battery in cold weather compared with a traditional lithium battery, the disclosed invention is also accompanied by increased complexity and size of the battery to a certain extent. Furthermore, application of ultrasonic waves from outside is not efficient. Therefore, the disclosed invention is not an optimal solution.

BRIEF SUMMARY OF THE INVENTION

An object of the present invention is to solve the above problems and deficiencies in the prior art and provide an electrode structure with built-in ultrasonic structures. In the present invention, an ultrasonic vibration element is placed inside the electrode, so that the ultrasonic vibration element will directly act on the electrode during operation, facilitate molecular movement inside the electrode, thereby eliminating crystallization on the electrode, preventing crystallization, and prolonging the service life of the battery; further, the molecular movement inside the electrode can also accelerate movement of current and electrons, and thus improve the efficiency of charging and discharging; besides, as the movement of current and electrons is fast and smooth, the problems of swelling and explosion of the battery can be avoided; moreover, in extremely cold environment, ultrasonic vibration also assists the battery to heat up, and thus solves the problem of low charging and discharging efficiency and operation failure of the battery in winter; also, the structures of the ultrasonic battery according to the present invention has greatly reduced complexity, so that the ultrasonic battery of the present invention can be developed with light weight and modularization. Accordingly, a further object of the present invention is to provide a kind of ultrasonic battery, which is very safe, resistant to swelling, explosion, cold weather and passivation, structurally simple, easy to produce, suitable to be industrialized, and which has high efficiency in charging and discharging, good performance, and long service life.

The technical solutions of the present invention are achieved as follows: an electrode structure with built-in ultrasonic structures, comprising an electrode which is a positive electrode or a negative electrode; and characterized in also comprising an ultrasonic vibration module built into the electrode; the ultrasonic vibration module comprises an ultrasonic vibration element and an insulating material layer surrounding all outer surfaces the ultrasonic vibration element; wire connection terminals electrically connected with the ultrasonic vibration element are provided at a top end of or on a top end of the electrode.

On the basis of the above disclosure, a further object of the present invention is to provide an ultrasonic solid lithium battery using more than one of said electrode structure with built-in ultrasonic structures, comprising two electrodes which are the positive electrode and the negative electrode, solid electrolyte, and battery shell, and characterized in also comprising the ultrasonic vibration module built into each of the electrodes; each ultrasonic vibration module comprises the ultrasonic vibration element and the insulating material layer surrounding all the outer surfaces of the ultrasonic vibration element; the wire connection terminals electrically connected with the respective ultrasonic vibration elements are provided at top ends of or on top ends of the electrodes respectively.

On the basis of the above disclosure, a further object of the present invention is to provide an ultrasonic lithium battery using more than one of said electrode structure with built-in ultrasonic structures, comprising two electrodes which are the positive electrode and the negative electrode, electrolyte solution, battery shell, and a separator, and characterized in also comprising the ultrasonic vibration module built into each of the electrodes; each ultrasonic vibration module comprises the ultrasonic vibration element and the insulating material layer surrounding all the outer surfaces of the ultrasonic vibration element; the wire connection terminals electrically connected with the respective ultrasonic vibration elements are provided at top ends of or on top ends of the electrodes respectively.

On the basis of the above disclosure, a further object of the present invention is to provide an ultrasonic lead-acid battery using more than one of said electrode structure with built-in ultrasonic structures, comprising two electrodes which are the positive electrode and the negative electrode, sulfate solution, and a battery shell, characterized in also comprising the ultrasonic vibration module built into each of the electrodes; each ultrasonic vibration module comprises the ultrasonic vibration element and the insulating material layer surrounding all the outer surfaces of the ultrasonic vibration element; the wire connection terminals electrically connected with the respective ultrasonic vibration elements are provided at top ends of or on top ends of the electrodes respectively.

Beneficial effects of the present invention: (1) in the electrode structure with built-in ultrasonic structures, the ultrasonic vibration element is placed inside the electrode, so that the ultrasonic vibration element will directly act on the electrode during operation, facilitate molecular movement inside the electrode, thereby eliminating crystallization on the electrode, preventing crystallization, and prolonging the service life of the battery; further, the molecular movement inside the electrode can also accelerate movement of current and electrons, and thus improve the efficiency of charging and discharging; besides, as the movement of current and electrons is fast and smooth, the problems of swelling and explosion of the battery can be avoided; moreover, in extremely cold environment, ultrasonic vibration also assists the battery to heat up, and thus solves the problem of low charging and discharging efficiency and operation failure of the battery in winter; also, the structures of the ultrasonic battery according to the present invention has greatly reduced complexity, so that the ultrasonic battery of the present invention can be developed with light weight and modularization.

(2) When applying the electrode structure of the present invention to a lead-acid battery, lithium battery, and solid lithium battery etc., an ultrasonic lead-acid battery, ultrasonic lithium battery, and ultrasonic solid lithium battery can be produced simply and conveniently. These batteries are very safe, resistant to swelling, explosion, and cold weather, structurally simple, easy to produce, suitable to be industrialized, and which have high efficiency in charging and discharging, good performance, and long service life. Compared with traditional batteries, the ultrasonic battery provided by the present invention solves the deficiencies such as crystallization, crystal piercing, swelling, leakage, explosion, slow charging and discharging, poor cold resistance, and weak performance as now existing in traditional non-ultrasonic batteries.

(3) The reason for passivation on the surfaces of material molecules of positive electrode, negative electrode and solid electrolyte is chemical reaction during the process of charging and discharging between the positive electrode and the solid electrolyte (or electrolyte solution) and between the negative electrode and the solid electrolyte (or electrolyte solution). The chemical reaction will first act upon the surface substances. After each time of chemical reaction, useless electrolyzed substances will be resulted, and these useless electrolyzed substances will be adhered to the surfaces of the positive electrode, the negative electrode, and the solid electrolyte, and thus affect the chemical reaction between them; eventually, charging and discharging performance as well as power storage performance of the battery will be significantly weakened, and the service life of the battery is shortened. Therefore, it is said that a battery can only be charged and discharged for a limited number of times. However, in the present invention, ultrasonic vibration elements are additionally provided in the positive electrode, the negative electrode, and the solid electrolyte respectively so as to make use of the cavitation effect during ultrasonic vibration of the ultrasonic vibration elements to vibrate the internal molecules of the substances of the positive electrode, the negative electrode, and the solid electrolyte vigorously, causing frictions between the molecules, thereby shaking off the useless electrolyzed substances. Therefore, surfaces that are not yet to be electrolyzed and reacted will expose again, and so during the charging and discharging processes of the battery, electrons can come into contact with these exposed surfaces and participate in the chemical reaction, thereby maintaining the performance of the battery.

DETAILED DESCRIPTION OF THE INVENTION

Embodiment 1

Figure 1:
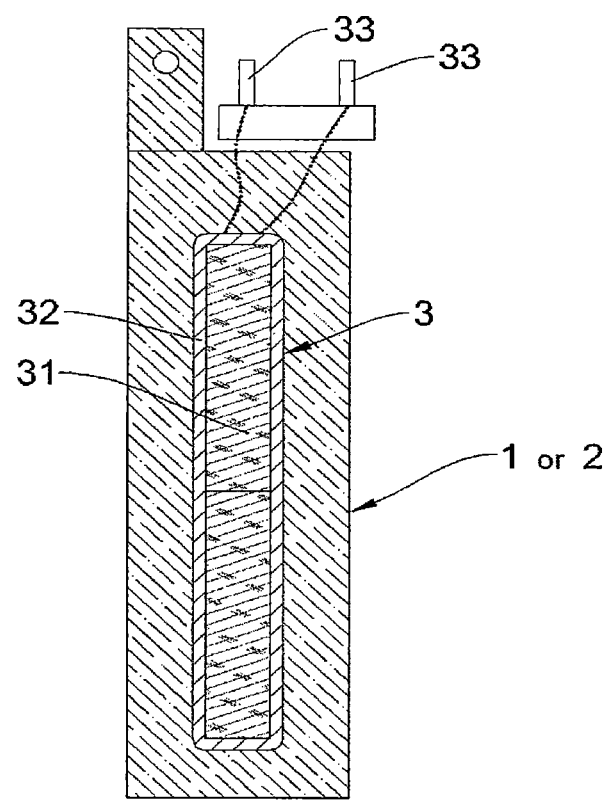
FIG. 1 is a schematic diagram showing a working principle of a positive electrode or a negative electrode according to the present invention.
Figure 2:
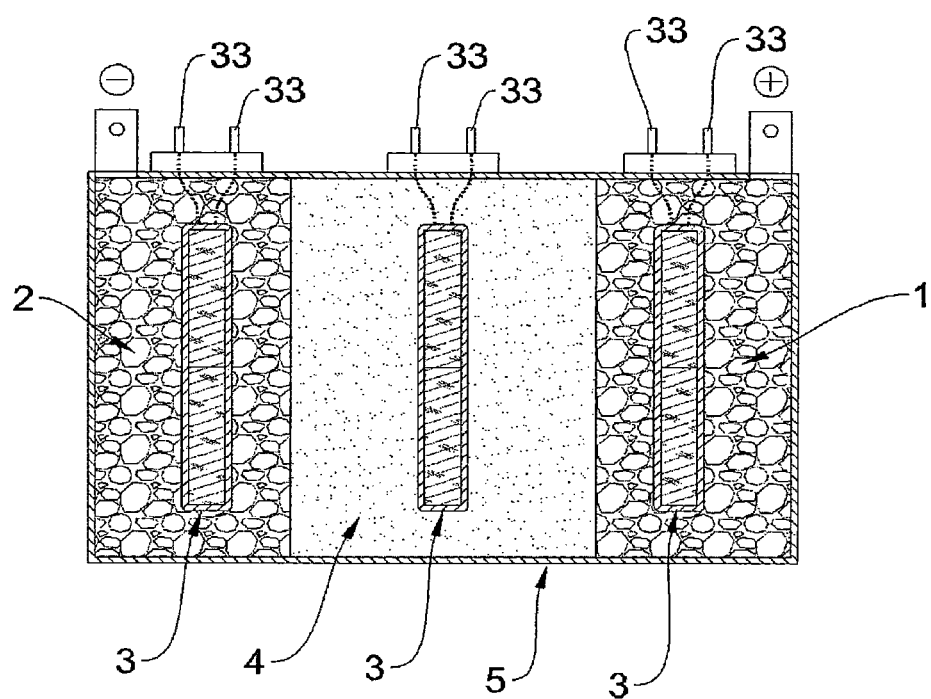
FIG. 2 is a schematic view showing a working principle of an ultrasonic solid lithium battery according to the present invention.

As shown in FIG. 1, an electrode structure with built-in ultrasonic structures according to the present invention comprises a positive electrode 1 or a negative electrode 2; in order to achieve the object of the present invention, also comprising an ultrasonic vibration module 3 built into the positive electrode 1 or the negative electrode 2; the term "built-in" refers to the installation or processing in the positive electrode 1 or the negative electrode 2 so that the ultrasonic vibration module is pre-embedded inside the positive electrode 1 or the negative electrode 2; and such built-in procedure depends on raw production materials used for making the positive electrode 1 or the negative electrode 2; for example, if metal materials are used, an inner cavity can be reserved in which the ultrasonic vibration module can be installed later; if non-metal materials are used, the ultrasonic vibration module 3 can be placed inside while making the positive electrode 1 or the negative electrode 2 so that the ultrasonic vibration module 3 can be formed integrally with the positive electrode 1 or the negative electrode 2. The ultrasonic vibration module 3 comprises an ultrasonic vibration element 31 and an insulating material layer 32 surrounding all outer surfaces the ultrasonic vibration element 31. Wire connection terminals 33 electrically connected with the ultrasonic vibration element 31 are provided at a top end of or on a top end of the positive electrode 1 or the negative electrode 2. Specifically, as shown in FIGS. 1 and 2, the wire connecting terminals 33 can be installed on a top surface of a battery shell 5, that is, outside a top end of the positive electrode 1, a top end of the negative electrode 2, and a top end of a solid electrolyte 4. In the present invention, the ultrasonic vibration element 31 is placed inside the electrode, so that the ultrasonic vibration element will directly act on the electrode during operation, facilitate molecular movement inside the electrode, thereby eliminating crystallization on the electrode, preventing crystallization, and prolonging the service life of the battery; further, the molecular movement inside the electrode can also accelerate movement of current and electrons, and thus improve the efficiency of charging and discharging; besides, as the movement of current and electrons is fast and smooth, the problems of swelling and explosion of the battery can be avoided; moreover, in extremely cold environment, ultrasonic vibration also assists the battery to heat up, and thus solves the problem of low charging and discharging efficiency and operation failure of the battery in winter; also, the structures of the ultrasonic battery according to the present invention has greatly reduced complexity, so that the ultrasonic battery of the present invention can be developed with light weight and modularization. The ultrasonic vibration module 3 can be an ultrasonic transducer of more than 1 MHz or an ultrasonic vibration motor of over 10,000 rpm.

Embodiment 2

Embodiment 2 is an application of the electrode structure with built-in ultrasonic structures according to embodiment 1 in a solid lithium battery to form an ultrasonic solid lithium battery. As shown in FIG. 2, the ultrasonic solid lithium battery comprises the positive electrode 1, the negative electrode 2, the solid electrolyte 4, and the battery shell 5, etc., and also comprises the ultrasonic vibration module 3 built into each of the positive electrode 1 and the negative electrode 2. Each ultrasonic vibration module 3 comprises the ultrasonic vibration element 31 and the insulating material layer 32 surrounding all the outer surfaces of the ultrasonic vibration element 31; the wire connection terminals 33 electrically connected with the respective ultrasonic vibration elements 31 are provided at top ends of or on top ends of the positive electrode 1 and the negative electrode 2 respectively. In order to further improve the effect and performance of the ultrasonic vibration modules 3 in the solid lithium battery, as shown in FIG. 2, an additional ultrasonic vibration module 3 is provided inside the solid electrolyte 4.

Embodiment 3

Figure 3:
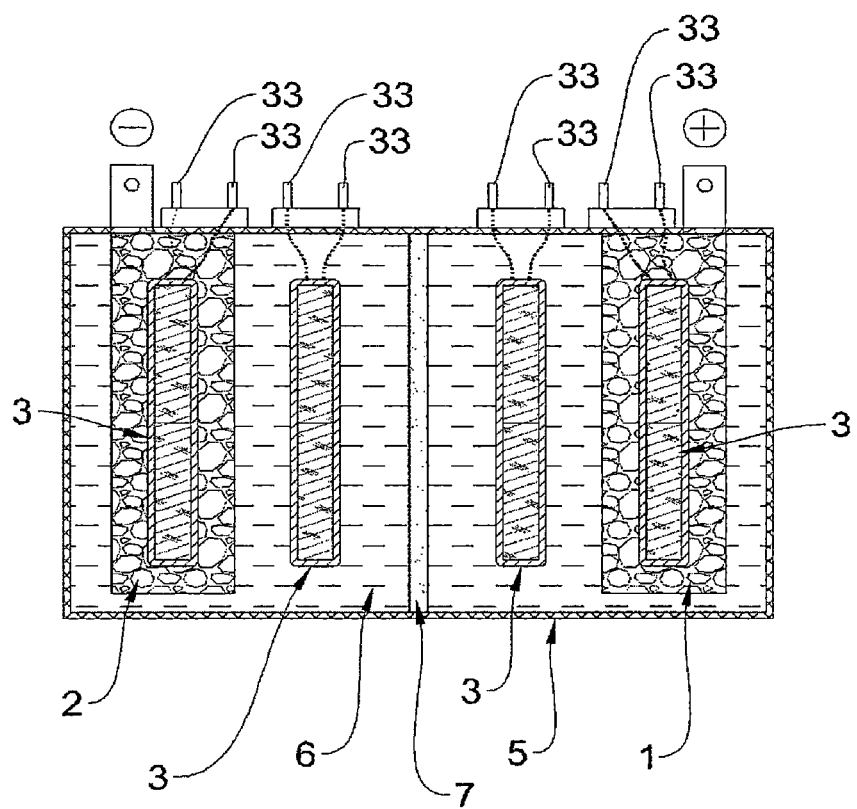
FIG. 3 is a schematic view showing a working principle of a lithium battery according to the present invention.

Embodiment 3 is an application of the electrode structure with built-in ultrasonic structures according to embodiment 1 in an ordinary lithium battery to form an ultrasonic lithium battery. As shown in FIG. 3, the ultrasonic lithium battery comprises the positive electrode 1, the negative electrode 2, electrolyte solution 6, the battery shell 5, and a separator 7, and also comprises the ultrasonic vibration module 3 built into each of the positive electrode 1 and the negative electrode 2. Each ultrasonic vibration module 3 comprises the ultrasonic vibration element 31 and the insulating material layer 32 surrounding all the outer surfaces of the ultrasonic vibration element 31; the wire connection terminals 33 electrically connected with the respective ultrasonic vibration elements 31 are provided at top ends of or on top ends of the positive electrode 1 and the negative electrode 2 respectively. In order to further improve the effect and performance of the ultrasonic vibration modules 3 in the lithium battery, additional ultrasonic vibration modules 3 are provided in the electrolyte solution 6 inside the battery shell 5.

Embodiment 4

Figure 4:
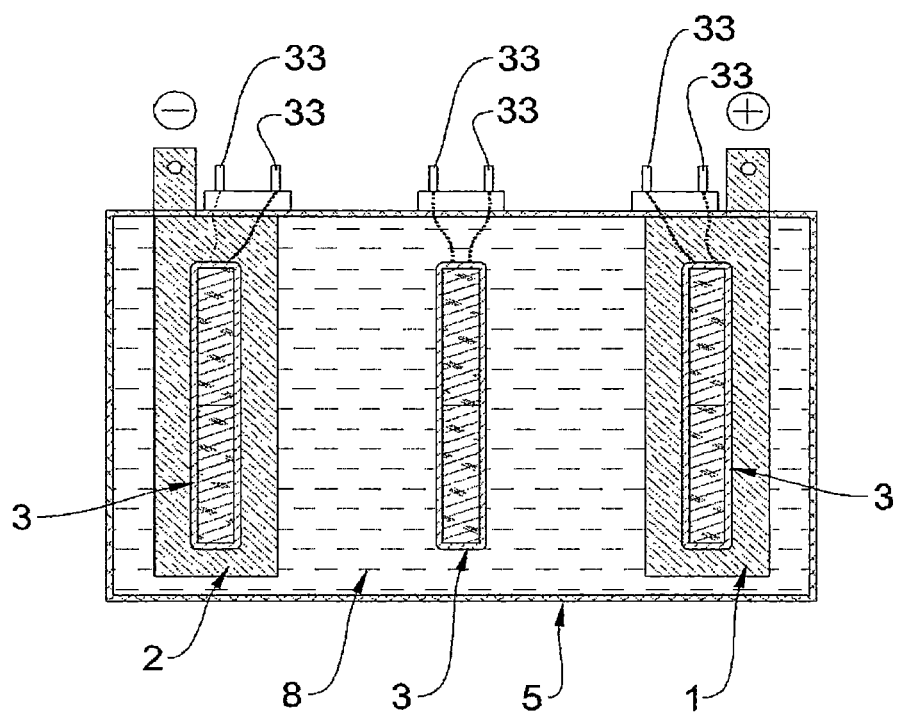
FIG. 4 is a schematic view showing a working principle of a lead-acid battery according to the present invention.

Embodiment 4 is an application of the electrode structure with built-in ultrasonic structures according to embodiment 1 in a lead-acid battery to form an ultrasonic lead-acid battery. As shown in FIG. 4, the ultrasonic lead-acid battery comprises the positive electrode 1, the negative electrode 2, sulfate solution 8, and the battery shell 5, and also comprises the ultrasonic vibration module 3 built into each of the positive electrode 1 and the negative electrode 2. Each ultrasonic vibration module 3 comprises the ultrasonic vibration element 31 and the insulating material layer 32 surrounding all the outer surfaces of the ultrasonic vibration element 31; the wire connection terminals 33 electrically connected with the respective ultrasonic vibration elements 31 are provided at top ends of or on top ends of the positive electrode 1 and the negative electrode 2 respectively. Likewise, in order to further improve the effect and performance of the ultrasonic vibration modules 3 in the lead-acid battery, an additional ultrasonic vibration module 3 is provided in the sulfate solution 8 inside the battery shell 5.

It should be noted that, the electrode structure having built-in ultrasonic structures is not only applicable to lead-acid battery, lithium battery and solid lithium battery, but can also be used as a positive electrode plate or negative electrode plate in a hydrogen and oxygen electrolysis device or equipment, so as to prevent passivation of the positive electrode plate or negative electrode plate in the hydrogen and oxygen electrolysis device or equipment, thereby maintaining a good performance of the device or equipment and increasing the efficiency of hydrogen and oxygen electrolysis.

Besides, the positive electrode 1 and the negative electrode 2 can be made by different materials depending on different types of batteries. For example, when being used in a zinc-air battery, the positive electrode 1 and the negative electrode 2 can be made by zinc material; when being used in an aluminum-air battery, the positive electrode 1 and the negative electrode 2 can be made by aluminum material; when being used in a lead-acid battery, the positive electrode 1 and the negative electrode 2 can be made by lead; when being used in a lithium battery, the positive electrode 1 and the negative electrode 2 can be made by suitable materials for making electrodes of the lithium battery. That is to say, the positive electrode 1 and the negative electrode 2 can be produced from different materials depending on the types of batteries.

The embodiments described above are only the preferred embodiments of the present invention, and should not limit the scope of protection of the technical solutions of the present invention. It should be noted that, various alterations and improvements can be made by a person skilled in this field of art without deviating from the inventive concept of the present invention, and these alterations and improvements should also be included by and fall within the scope of protection of the present invention.

What is claimed is:

1. An electrode structure with built-in ultrasonic structures, comprising an electrode which is a positive electrode or a negative electrode, characterized in also comprising an ultrasonic vibration module built into the electrode; wherein the ultrasonic vibration module comprises an ultrasonic vibration element and an insulating material layer surrounding all outer surfaces of the ultrasonic vibration element, and further comprises wire connection terminals electrically connected with the ultrasonic vibration element at a top end of or on a top end of the electrode.

2. An ultrasonic solid lithium battery using more than one of said electrode structure with built-in ultrasonic structures according to claim 1, comprising two electrodes which are the positive electrode and the negative electrode, solid electrolyte, and battery shell, and characterized in also comprising the ultrasonic vibration module built into each of the electrodes; wherein each ultrasonic vibration module comprises the ultrasonic vibration element and the insulating material layer surrounding all the outer surfaces of the ultrasonic vibration element, and wherein the wire connection terminals electrically connected with the respective ultrasonic vibration elements are provided at top ends of or on top ends of the electrodes respectively.

3. The ultrasonic solid lithium battery of claim 2, wherein an additional ultrasonic vibration module is provided inside the solid electrolyte.

4. An ultrasonic lithium battery using more than one of said electrode structure with built-in ultrasonic structures according to claim 1, comprising two electrodes which are the positive electrode and the negative electrode, electrolyte solution, a battery shell, and a separator, and characterized in also comprising the ultrasonic vibration module built into each of the electrodes; wherein each ultrasonic vibration module comprises the ultrasonic vibration element and the insulating material layer surrounding all the outer surfaces of the ultrasonic vibration element, and wherein the wire connection terminals electrically connected with the respective ultrasonic vibration elements are provided at top ends of or on top ends of the electrodes respectively.

5. The ultrasonic lithium battery of claim 4, wherein additional ultrasonic vibration modules are provided in the electrolyte solution inside the battery shell.

6. An ultrasonic lead-acid battery using more than one of said electrode structure with built-in ultrasonic structures according to claim 1, comprising two electrodes which are the positive electrode and the negative electrode, sulfate solution, and a battery shell, characterized in also comprising the ultrasonic vibration module built into each of the electrodes; wherein each ultrasonic vibration module comprises the ultrasonic vibration element and the insulating material layer surrounding all the outer surfaces of the ultrasonic vibration element the, and wherein the wire connection terminals electrically connected with the respective ultrasonic vibration elements are provided at top ends of or on top ends of the electrodes respectively.

7. The ultrasonic lead-acid battery of claim 6, wherein an additional ultrasonic vibration module is provided in the sulfate solution inside the battery shell.

* * * * *